July 13, 1954
W. SCHAELCHLIN
2,683,849
DELAYED REVERSE CURRENT PROTECTION
Filed Aug. 10, 1949
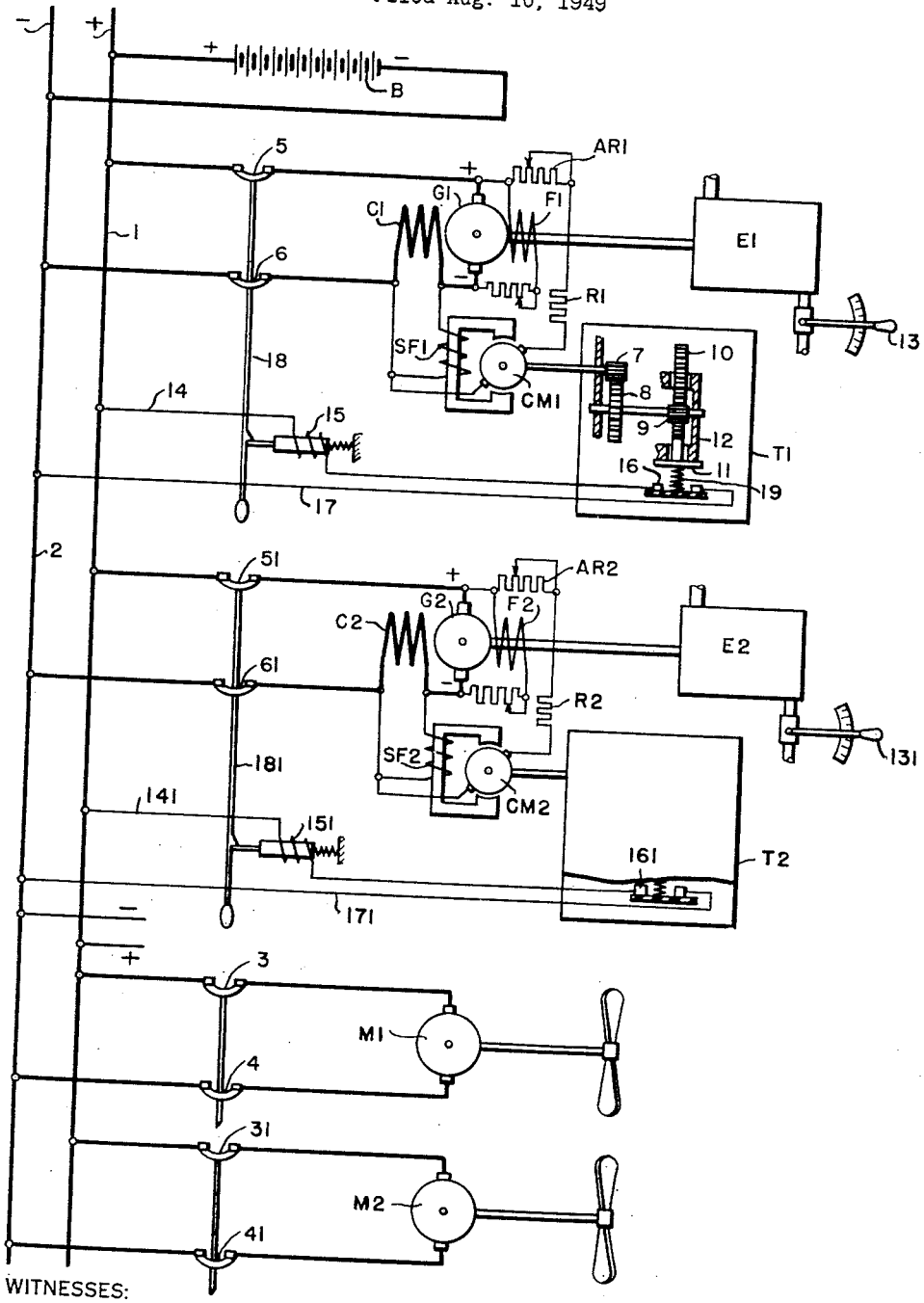
WITNESSES:
INVENTOR
Walter Schaelchlin.
BY
Paul E. Friedemann
ATTORNEY Patented July 13, 1954

2,683,849

UNITED STATES PATENT OFFICE 2,683,849

DELAYED REVERSE CURRENT PROTECTION

Walter Schaelchlin, Buffalo, N. Y., assignor to Westinghouse Electric Corporation, East Pittsburgh, Pa., a corporation of Pennsylvania Application August 10, 1949, Serial No. 109,589

7 Claims. (Cl. 318—500)

My invention relates to electric protective apparatus, and more particularly to electric apparatus for effecting the disconnection of a source of electric energy from load circuits in the event of a reverse current flow in the circuit.

Reverse current relays are well known in the electric art and, for the usual problems encountered, function with fair success. However, for the new high-speed submarine under development by the United States Navy, a delayed reverse current protection becomes highly necessary.

To fully appreciate my invention, a few brief statements of the nature of the problem involved will be most desirable. Whenever a submarine is going into a crash dive, while the propulsion motors are being supplied from the batteries and the main generators connected in parallel, it is necessary for the operators to shut off the fuel supply to the diesel engines before closing the exhaust hatches. The ideal timing should be such that the exhaust hatches are closed the instant the engines have stopped. Experience has shown, however, that the engines keep on running with the respective main generators coupled to the engines, each operating as a motor receiving electric energy from the battery. The engines thus act as a pressure pump effecting, rather violently, changes in the air pressure in the submarine, thereby causing possible injury to the operating personnel. Further, during the excitement of a crash dive requiring many concerted acts of the operating personnel, the operators sometimes forget to disconnect the generators from the main buses.

The conventional reverse current protective apparatus of the instantaneous type is not satisfactory for solving the problem this application presents because, during normal maneuvers, there will be reverse current surges when slowing down the propeller motors, and yet it is absolutely essential that there be no tripping of the main generator circuit breakers during normal operation.

One broad object of my invention is the provision of means for properly timing the opening of an electric circuit upon the occurrence of a reverse current in the electric circuit.

Another broad object of my invention is the provision of means for disconnecting an electric generator from its load circuit as a function of a selected current and voltage change of the generator for a selected time period.

A more specific object of my invention is the provision for disconnecting the generator in a submarine propulsion drive from the battery and propulsion motors upon the occurrence of a reverse current in the generator leads for a selected time interval.

Depth-bombs cause considerable shocks on the equipment though no direct hit has been made by the enemy. These operating conditions and others add the requirement of the electric apparatus that there is no impairment of the service because of shocks. Conventional reverse current relays in combination with timing relays have been found wanting because no combination of relays could be found that would give both delayed action and at the same time be shockproof.

One other object of my invention is thus the provision of shockproof time-delayed reverse-current protection for electric devices.

Other objects and advantages will become more apparent from a study of the following specification and the accompanying drawing, in which the single figure shows, diagrammatically, the propulsion equipment of a submarine, the propulsion equipment being provided with my novel delayed reverse current protection.

In a submarine propulsion system, a minimum of two sources of direct-current electric energy are necessary to energize the propulsion motor, or motors, as the case may be.

In the drawing, B designates the battery for supplying the buses 1 and 2 with direct current electric energy and G1 represents a generator coupled to an engine E1, as a diesel engine, for also supplying direct-current electric energy to the buses 1 and 2. A propulsion motor M1 is connected to the buses 1 and 2 through suitable switches 3 and 4. The generator G1 is connected to the buses 1 and 2 through the switches 5 and 6. Switches 3 and 4 are on one operator and thus function in unison, and switches 5 and 6 are also on one operator and thus function in unison.

During surface cruising, the voltage of the generators is often adjusted so that the battery B is being charged but when more power is needed, as for higher speed operation, then both the battery and generator G1 operate in parallel to supply energy to the propulsion motor M1.

The generator G1 is provided with the main field F1 and a commutating field C1.

To provide delayed reverse current protection that is also shockproof, I utilize a relatively small and sturdy control motor CM1 that is provided with a separately excited field SF1 connected across the commutating field C1 of the generator G1. The field SF1 is thus excited as a function of the load current of the generator G1. The armature of the control motor CM1 is connected, through a suitable adjustable resistor AR1 and a resistor R1 of fixed resistance value, to the armature terminals of the generator G1, as shown. The armature of control motor CM1 is thus energized as a function of the generator voltage.

When the generator is supplying current to the buses 1 and 2, the voltage drop across field C1 is from left to right for the polarities assumed and indicated by the signs.

The connection is such that when there is normal operation, the control motor merely produces a torque on pinion 7, so that the gear transmission T1 through pinion 7, gear 8, pinion 9 and rack 10, operates the contacts 11 to engage the frame 12.

When a crash dive, or any other dive is being made, the fuel lever 13 is moved to the zero or off position to stop the engine. If the switches 5 and 6 remain closed, the battery supplies current to the generator G1 and in consequence the current reverses in the field C1 but the polarity on the armature of the control motor does not reverse. In consequence, the motor CM1 reverses its torque and thus proceeds to so rotate that the gear transmission T1 drives the contacts 11 downwardly.

After a predetermined number of revolutions of the control motor CM1, the contact 11 bridges the contacts 16 whereupon a circuit is established from bus 1 through conductor 14, latch actuating coil 15, contacts 16 and conductor 17 to the bus 2. The latch actuating coil unlatches the operator 18 and in consequence the switches 5 and 6 are opened to disconnect the generator G1 from buses 1 and 2.

When the control motor CM1 has completed its operation, by causing contact 11 to bridge contacts 16, the buses 1 and 2 will, of course, be disconnected, at switches 5 and 6, from the generator G1. In consequence, the control motor CM1 will be deenergized. Spring 19 will thus drive the rack 10 upwardly and the pinion 9, gear 8, and pinion 7 will automatically reset the control motor for the next operation. Any other resetting means may, of course, be provided.

When the engine E1 is up to full speed, it is apparent that the control motor torque, and thus its operation, will be in the direction to reset the contact 11 to the position shown.

Most modern submarines have two engines and two generators. When such is the case, a second control motor CM2 is necessary to effect the operation of operator 181.

Reference characters 31, 41, 51, 61, 131, 141, 151, 161, 171 and 181 refer to certain portions of the duplicate equipment and correspond to reference characters 3, 4, 5, 6, 13, 14, 15, 16, 17 and 18 already described. The reference characters G2, M2, E2, C2, F2, T2, AR2, R2, SF2, and CM2 correspond to the reference characters G1, M1, E1, C1, F1, T1, AR1, R1, SF1 and CM1.

While I have shown and described but a single embodiment of my invention, it will be understood that various changes may be made in the arrangement and combination of parts and that the schematic showing of the circuits is subject to various changes all within the spirit of my invention.

I claim as my invention:

1. In a system of control in combination, a main generator having an interpole winding and an armature winding, a prime mover for driving the generator, a load circuit, switching means for controlling the interconnection of the generator with the load circuit, a control motor having a field winding and an armature winding, said control motor field winding being connected across the interpole winding to thus be energized as a function of the generator armature current, said control motor armature winding being connected to the generator armature terminals, whereby a reverse current in the generator interpole winding effects reverse operation of the motor, and means responsive to a selected number of control motor revolutions in the reverse direction for controlling the operation of said switching means.

2. In reverse current protective means the combination of, a load circuit, a pair of sources of direct-current electric energy connected in parallel to said load circuit, a control motor having an armature winding and a field winding, said armature winding being connected to one source of supply to be energized in magnitude and direction as a function of the voltage of said one source and the field winding being connected to be energized in magnitude and direction as a function of the load current of said one source, and means responsive to reverse operation of said control motor for a selected time interval, as a result of a reversal of the current in the load circuit of said one source, for disconnecting the said one source from the load circuit.

3. In submarine propulsion equipment, a propulsion motor, a generator driven by a suitable engine to provide a source of direct-current potential to the motor, a battery connected to the propulsion motor, switching means for disconnecting the generator from the propulsion motor, a control motor having one winding energized as a function of the generator voltage and having a second winding energized as a function of the generator load current, said motor being operable in a given direction upon a flow of current from the battery to the generator, and means operable after a given number of motor revolutions in said given direction for causing the operation of the switching means to disconnect the generator from the battery.

4. A reverse current protective device for a generator and battery connected in parallel to a load circuit, in combination, a control motor having a field winding interconnected with one generator lead to be energized as a function of the generator load current and having an armature winding connected to the generator terminals to thus be energized by the generator voltage, said motor armature being blocked against rotation in a forward direction when the generator current flows from the generator to the load circuit but being free to rotate in a reverse direction upon a flow of current from the battery to the generator, and means responsive to reverse operation of the motor for disconnecting the generator from the battery.

5. A reverse current protective device for a generator and battery connected in parallel to a load circuit, in combination, a control motor having a field winding interconnected with one generator lead to be energized as a function of the generator load current and having an armature winding connected to the generator terminals to thus be energized by the generator voltage, said motor armature being blocked against rotation in a forward direction when the generator current flows from the generator to the load circuit but being free to rotate in a reverse direction upon a flow of current from the battery to the generator, means responsive to reverse operation of the motor for disconnecting the generator from the battery, and means for resetting the motor to its blocked position upon disconnection of the generator from the battery.

6. In reverse current apparatus for a generator, having an armature winding and an interpole, or commutating, winding, and a battery connected in parallel to a load circuit, in combination, a motor having a field winding connected across the terminals of the interpole winding and an armature connected to the generator terminals, whereby said motor will be caused to operate in one direction and will operate in a reverse direction upon a flow of current from the battery to the generator.

7. In shockproof time-delayed reverse-current protective apparatus for a generator, having an armature winding and an interpole, or commutating, winding, and a battery connected in parallel to a load circuit, in combination, a motor having a field winding connected across the terminals of the interpole winding and an armature connected to the generator terminals, whereby said motor will be caused to operate in one direction and will operate in a reverse direction upon a flow of current from the battery to the generator, and means responsive to the operation of the motor in a reverse direction for a given time interval for effecting the disconnection of the generator from the battery.

References Cited in the file of this patent

UNITED STATES PATENTS

| Number | Name | Date |
|---|---|---|
| 661,520 | Haskins | Nov. 13, 1900 |
| 1,033,508 | Woodbridge | July 23, 1912 |
| 2,395,000 | Kellogg | Feb. 19, 1946 |
| 2,502,249 | Cotten, Jr. et al. | Mar. 28, 1950 |